April 20, 1926. 1,581,486
E. H. JOHNSON
EXTRUDING MACHINE
Filed April 1, 1925 2 Sheets-Sheet 1
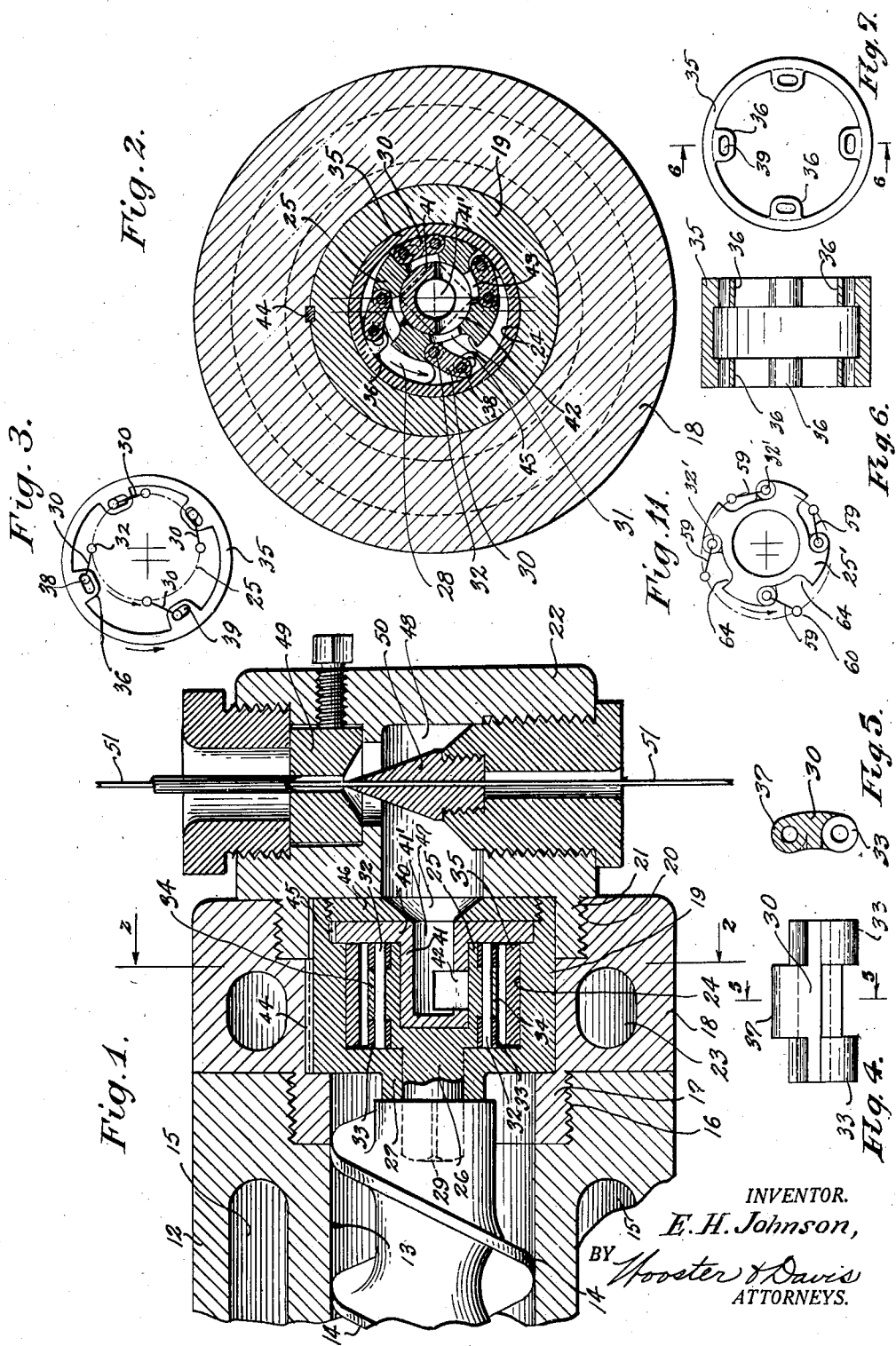
INVENTOR.
E. H. Johnson,
BY Wooster & Davis
ATTORNEYS.

April 20, 1926.  E. H. JOHNSON,  1,581,486
EXTRUDING MACHINE
Filed April 1, 1925  2 Sheets-Sheet 2
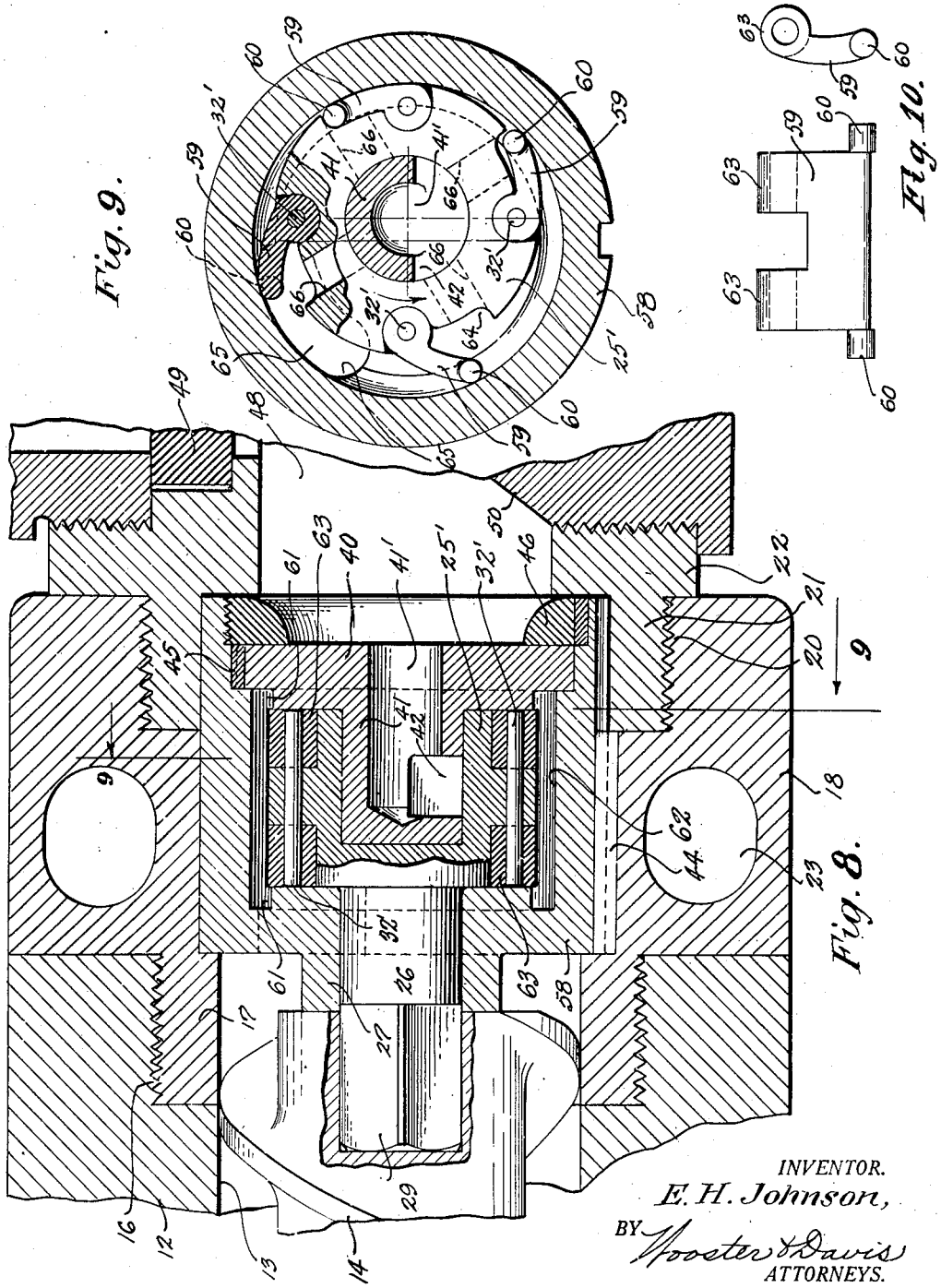
INVENTOR.
E. H. Johnson,
BY Wooster & Davis
ATTORNEYS.

Patented Apr. 20, 1926.

1,581,486

UNITED STATES PATENT OFFICE.

EDGAR H. JOHNSON, OF STAMFORD, CONNECTICUT.

EXTRUDING MACHINE.

Application filed April 1, 1925. Serial No. 19,829.

*To all whom it may concern:*

Be it known that I, EDGAR H. JOHNSON, a citizen of the United States, residing at Stamford, county of Fairfield, State of Connecticut, have invented a new and useful Extruding Machine, of which the following is a specification.

This invention relates to extruding machines and has for an object to provide an improved means for feeding the plastic material and increasing the pressure thereon so that it will be properly extruded through the die.

I have illustrated my invention as applied to a wire covering machine of a type now in general use, and when so applied will greatly increase the output thereof. I have, however, not illustrated the entire machine as it is believed this is unnecessary. I wish it to be distinctly understood however, that this device is not limited to use with wire covering machines as it will be obvious that it may be used in other types of devices where it is required that plastic material be fed or forced under high pressure, such as machines for extruding tubes, straining plastic compounds and so forth.

In wire covering machines, or the like, now generally in use where some suitable plastic material, such as a rubber composition is extruded through a die onto the wires as it passes through the die, or through dies to form a tube, or through a strainer, or the like, a worm or screw feed is generally employed to feed the plastic material to the extruding chamber of the die, and to produce the pressure thereon which extrudes the material through the die. With this type of feed, the pressure on the plastic material in the die cannot be made to exceed a certain amount, as above this point it will rotate with the screw or worm and will not be fed forwardly, so that the output from this type of machine is very limited. This is especially true where the plastic material used is quite soft, as it should be to extrude properly. In fact, under these conditions, it is difficult to obtain sufficient pressure on the material in the die to extrude the same. I overcome these difficulties and greatly increase the output of the machine by placing between the ordinary worm or screw feed and the extruding die, a positively acting feeding device having practically no slippage, even when feeding a comparatively soft material. For this purpose I provide a chambered casing and mount therein a rotor which is arranged eccentrically of the casing so as to leave a space between the rotor and the wall of the chamber on one side thereof. There is an inlet opening from the screw conveyor to this space and a plurality of forcing elements are pivoted to the rotor with means coacting with the casing to swing the free ends of these elements toward and from the rotor as this rotor is rotated, and the rotor is provided with outlet openings beneath the forcing elements through which these elements force the plastic material out of the casing to the die. I have found that by applying this device between the feed screw and the die the plastic material is positively fed to the die under a sufficiently high pressure and in sufficient quantities to greatly increase the output of the machine.

With the foregoing and other objects in view, I have provided the construction illustrated in the accompanying drawings forming a part of this specification, similar reference characters being employed throughout the various figures to indicate corresponding elements. In these drawings, Fig. 1 is a longitudinal section through the die end of a wire covering machine showing one form of my improved feeding means applied thereto.

Fig. 2 is a transverse section substantially on line 2—2 of Fig. 1.

Fig. 3 is a diagrammatic view illustrating the operation of this feeding device.

Fig. 4 is a side elevation of one of the forcing elements.

Fig. 5 is a transverse section thereof substantially on line 5—5 of Fig. 4.

Fig. 6 is a longitudinal section of the ring for swinging the forcing elements about their pivots.

Fig. 7 is an end elevation thereof.

Fig. 8 is a view similar to Fig. 1 showing a slightly different construction of feeding means.

Fig. 9 is a transverse section through the feeding means substantially on line 9—9 of Fig. 8.

Fig. 10 is a side and end elevation of the forcing elements used in the feeding device of Figs. 8 and 9, and Fig. 11 is a diagrammatic view showing the operation of the device of Figs. 8, 9 and 10.

The wire covering machine to which the device is applied comprises a cylinder 12 of which I have shown only the discharge end. Mounted to rotate in this cylinder, and of substantially the same diameter as a bore 13 through the cylinder, is a screw conveyor 14. There is, of course, means for feeding the plastic material to the screw, which means is not illustrated, and the cylinder has chambers 15 in the walls thereof for either a heating or cooling fluid to maintain the compound at the proper temperature to give the required consistency.

In the present construction the end of the cylinder is counterbored and threaded as shown at 16, to receive the correspondingly threaded projection 17 on the block 18. This block has an opening therethrough in which is mounted the casing 19, the block being also counterbored and threaded as shown at 20 to receive the threaded extension 21 on the die block or insulating head 22. The block 18 may also be provided with a chamber 23 in the walls thereof for heating or cooling fluid.

The casing 19 has a cylindrical chamber 24 in which is mounted the rotor 25, and this rotor is mounted eccentrically of the casing as indicated in Fig. 2 so that it is spaced from one side of the chamber. The rotor has a laterally projecting bearing stud 26 mounted in a bearing 27 in the end of the casing next to the screw conveyor 14, and this end of the casing is provided with an inlet opening 28 leading from the bore of the cylinder 12 to the space between the casing and the rotor, as indicated in Fig. 2. The rotor is preferably driven from the screw conveyor, a convenient driving means being to provide the stud 26 with a square head 29 in a correspondingly shaped recess in the end of the screw.

Pivoted to the rotor are one or more, preferably a plurality, of forcing or feeding elements 30 and the rotor is provided with recesses 31 into which these elements may seat in certain positions of the rotor so that they do not project beyond the surface of the rotor when they are on the side of the rotor closely adjacent the wall of the chamber, as indicated at the right of Fig. 2. These feeding or forcing elements are hinged to the rotor at one end as by means of pivot pins 32 extending through ears 33 on the elements and ears 34 on the rotor, which latter ears are straddled by the ears 32 as shown in Fig. 1. At their opposite ends these feeding elements are pivoted to a ring 35 which fits the cylindrical wall of the chamber 24, and this ring has inwardly extending lugs 36 which straddle ears 37 on the elements 30 and to which they are pivoted by pins 38. The lugs 36 are provided with elongated slots 39 to allow a certain sliding movement of the pivot pins 38 which is required by the movement of the feeding elements as will presently be apparent.

The rotor is held in the chamber 24 by means of a block 40 which has a laterally extending bearing stud 41 projecting into a correspondingly shaped bearing in the center of the rotor, and this stud has a longitudinal passage 41' therein with an opening 42 on one side thereof in the same plane with the outlet openings 43 in the rotor, there being one of these openings from each recess 31 beneath the feeding elements. The casing 19 is held against rotation in the block 18 by means of a key 44, and the block 40 is held against rotation by means of a key 45, and this block is retained in position in the casing by means of a plate 46 threaded into the casing as indicated in Fig. 1. This plate has an opening 47 communicating with the outlet passage 41' and by which this passage is placed in communication with the chamber 48 in the die block or insulating head 22.

Mounted in one side of this insulating head is the die 49 and there is a suitable guide 50 in alignment with the opening in this die through which the wire 51 to be covered is guided to the die and held centrally of the opening therein.

The operation of this device is as follows: The plastic material such as the rubber composition or compound is fed to the cylinder 12 and is forced under pressure by the screw 14 through the inlet opening 28 to the space between the rotor and the walls of the chamber 24. As the rotor 25 rotates counterclockwise or in the direction indicated by the arrow (Fig. 2) the feeding elements will be carried along with the rotor and through their connection with the ring 35 will rotate this ring. However, as the rotor is arranged eccentrically to the ring, as indicated in Fig. 2, it will be obvious that the portion of the ring on the right hand side of the rotor, as viewed in this figure, will be closely adjacent the wall of the rotor, while on the opposite or left hand side, as viewed in this figure, it will be spaced a considerable distance therefrom depending upon the amount to which the rotor is offset with respect to the ring. The plastic material coming through the inlet 28 will fill the space between two adjacent feeding elements, and as the rotor rotates the free ends of these elements swing in towards the rotor and will force the plastic material with a positive action and under high pressure through the outlet openings 43, the lateral opening 42 into the passage 41' and from this passage into the chamber 48 in the die block from which it will be forced through the die and onto the wire 51 covering the same. The passage of the material through the die in addition to covering the wire will feed the wire through the die. The slots 39 in the lugs 36 on the ring 35 should be elongated to allow for the swinging movement of the free ends of the feeding elements 30 required in the above described operation.

In Figs. 8 to 11 I have shown a slightly different construction. The casing 58 is mounted in the block 18 the same as in the first form and carries the rotor 25'. In this construction, however, instead of the ring 35 for swinging the free end of the feeding or forcing elements 59 inwardly and outwardly toward and from the rotor, these elements are provided with laterally extending lugs 60 at their opposite ends which extend into annular grooves 61 in the end walls of the chamber 62 in the casing. The elements 59 are provided at their outer ends with ears 63 straddling the ears 34 on the rotor to which they are pivoted by the pins 32'. The rotor is provided with recesses 64 corresponding to the shape of the feeding elements. Otherwise this feeding device is the same as in the first form. This feeding device operates as follows: The rotor is arranged eccentric to the chamber 62 in the casing the same as in the first form and as indicated in Fig. 9. The plastic material is forced into this chamber and the space between the rotor and casing through the inlet opening 65 in the end of the casing, and as the rotor is rotated in the direction of the arrow (Fig. 9) the outer wall of the chamber bearing against the outer ends of the feeding elements 59 will force these free ends in toward the rotor to the position shown at the right hand of Fig. 9 on account of the eccentric arrangement of this wall with respect to the rotor, and this movement of the feeding elements will force the plastic material through the outlet openings 66 under these elements, through the lateral opening 42 into the passage 41' and to the chamber 48 in the die block, the same as in the first form. As the elements 59 move from the position at the right hand of Fig. 9 to the position at the top of this figure the grooves 61 acting on the lugs 60 will swing the free ends of these elements outwardly as will be apparent. The construction shown in Figs. 1 to 7 is preferred because the feeding elements do not bear directly on the wall of the chamber in the casing and so do not wear as rapidly and the friction is not so great, the ring 35 giving a better and greater bearing.

It will be apparent from the foregoing description that the auxiliary feeding device between the screw feed and the die is of very simple construction involving a small number of parts, but that there is a positive movement of the free ends of the feeding elements which as they closely fit the walls of the chamber will positively force the plastic material through the outlet openings 43 and 66 under high pressure to the die, and this pressure may be made practically anything desired within the limits of the structure employed. As the operation of the feeding elements is positive there is practically no slippage.

Having thus set forth the nature of my invention, what I claim is:

1. In an extruding machine a feeding device for plastic material comprising a chambered casing, a rotor in said casing arranged eccentric thereto, said casing being provided with an inlet opening to the space between the casing and the rotor, a feeding element pivoted to the rotor, means coacting with the casing to swing the free end of said element toward and from the rotor as said rotor is rotated, said rotor being provided with an outlet opening under said element, means for feeding plastic material through said inlet under pressure, an extruding die arranged to receive the plastic material from said outlet, and means for driving the rotor.

2. In an extruding machine a feeding device for plastic material comprising a chambered casing, a rotor in said casing arranged eccentric thereto, said casing being provided with an inlet opening to the space between the casing and the rotor, said rotor being provided with a recess in its outer wall, a feeding element pivoted to the rotor adjacent one end and adapted to swing into and from the recess, means coacting with the casing to swing said element into and from the recess, said rotor being provided with an outlet opening leading from said recess, means for feeding plastic material through the inlet opening under pressure, an extruding die arranged to receive plastic material from said outlet, and means for driving the rotor.

3. An extruding machine comprising a cylinder, a screw conveyor in said cylinder and of substantially the same diameter as said cylinder so that said conveyor is adapted to convey plastic material and discharge it from the cylinder under pressure, a positively acting feeding mechanism connected with said cylinder to receive the plastic material therefrom, said feeding mechanism comprising a chambered casing, a rotor in said chamber and arranged eccentric thereto, a feeding element pivoted to the rotor, means coacting with the casing for swinging said element toward and from the rotor as the rotor is rotated, said rotor being provided with an outlet opening beneath said element, an extruding die arranged to receive plastic material from said outlet, and a driving connection from the discharge end of the screw conveyor to said rotor.

4. In an extruding machine a feeding device for plastic material comprising a chambered casing, a rotor in said casing arranged eccentric thereto, said casing being provided with an inlet opening to the space between the casing and the rotor, a feeding element pivoted to the rotor, a ring mounted to turn in the chamber in the casing and arranged eccentric to the rotor, said ring having pivotal connection with the other end of the feeding element, said rotor being provided with an outlet under said element, an extruding die arranged to receive plastic material from said outlet, means for feeding plastic material through said inlet under pressure, and means for driving the rotor.

5. In an extruding machine a feeding device for plastic material comprising a chambered casing, a rotor in said casing arranged eccentric thereto, said casing being provided with an inlet opening to the space between the casing and the rotor, a feeding element pivoted to the rotor, means coacting with the casing to swing the free end of said element toward and from the rotor as said rotor is rotated, said rotor being provided with an outlet opening under said element, a block for retaining the rotor in the casing and provided with a laterally extending bearing stud projecting into a bearing in the rotor, said stud being provided with a passage therethrough and arranged to communicate with said outlet in certain positions of the rotor, an extruding die arranged to receive the plastic material from said passage, means for feeding plastic material through said inlet under pressure, and means for driving the rotor.

6. An extruding machine comprising a cylinder, a screw conveyor in said cylinder and of substantially the same diameter as said cylinder so that said conveyor is adapted to convey plastic material and discharge it from the cylinder under pressure, a positively acting feeding mechanism connected with said cylinder to receive the plastic material therefrom, said feeding mechanism comprising a casing, a rotatable element in the casing and mounted eccentrically thereof, one or more feeding elements pivoted to the rotatable element and inclined with respect thereto, means coacting with the casing to swing said element or elements about their pivot or pivots as the rotary element is rotated, there being an inlet from the screw cylinder to the space between the rotating element and the casing and an outlet therefrom in the rotating element through which the material is forced by the pivoted elements, an extruding die arranged to receive the plastic material from said outlet, and means for rotating the rotary element.

7. In an extruding machine a feeding device for plastic material comprising a chambered casing, a rotor in said casing arranged eccentric thereto, said casing being provided with an inlet opening to the space between the casing and the rotor, said rotor being provided with a plurality of recesses in the outer wall thereof, a plurality of feeding elements pivoted to the rotor and adapted to swing into and from said recesses, a ring mounted to rotate in the chamber in the casing and arranged eccentric to the rotor, the other ends of the feeding elements being pivoted to said ring, said rotor being provided with an outlet from each recess, an extruding die arranged to receive plastic material from said outlets, means for feeding plastic material through said inlet under pressure, and means for driving the rotor.

In testimony whereof I affix my signature.

EDGAR H. JOHNSON.